(12) United States Patent
Lin (10) Patent No.: US 8,622,400 B2
(45) Date of Patent: Jan. 7, 2014

(54) QUICK AND RELIABLE TOOL

(75) Inventor: Jack Lin, Taichung (TW)

(73) Assignee: Yih Cheng Factory Co., Ltd, Taichung (TW)

( * ) Notice: Subject to any disclaimer, the term of this patent is extended or adjusted under 35 U.S.C. 154(b) by 930 days.

(21) Appl. No.: 12/764,952

(22) Filed: Apr. 22, 2010

(65) Prior Publication Data

US 2011/0260415 A1    Oct. 27, 2011

(51) Int. Cl.
*B23B 31/107* (2006.01)

(52) U.S. Cl.
USPC ............... 279/14; 279/74; 279/75; 279/82; 279/904; 279/905

(58) Field of Classification Search
USPC .......... 279/14, 74–78, 82, 137, 143, 904, 905
IPC ....................................................... B23B 31/107
See application file for complete search history.

(56) References Cited

U.S. PATENT DOCUMENTS

| | | | |
|---|---|---|---|
| 2,481,945 A * | 9/1949 | Panyard | 279/82 |
| 4,571,132 A * | 2/1986 | Bunge | 409/234 |
| 5,996,452 A * | 12/1999 | Chiang | 81/429 |
| 6,511,268 B1 * | 1/2003 | Vasudeva et al. | 408/239 R |
| 6,808,182 B2 * | 10/2004 | Lin | 279/74 |
| 6,874,791 B2 * | 4/2005 | Chen et al. | 279/75 |
| 6,877,751 B2 * | 4/2005 | Hsing | 279/14 |
| 7,097,398 B2 * | 8/2006 | Hernandez, Jr. | 408/224 |
| 7,407,349 B2 * | 8/2008 | Kaiser et al. | 408/180 |
| 7,669,860 B2 * | 3/2010 | Chiang | 279/143 |
| 7,845,428 B2 * | 12/2010 | Sakamaki et al. | 173/164 |
| 7,871,080 B2 * | 1/2011 | Marini et al. | 279/71 |
| 7,922,180 B2 * | 4/2011 | Meng | 279/143 |

* cited by examiner

*Primary Examiner* — Eric A Gates (57) ABSTRACT

A tool includes a chuck connected to a handle. The chuck includes a mandrel including a non-circular cavity defined therein, a slit in communication with the non-circular cavity, a first bore in communication with the non-circular cavity, and a second bore in communication with the slit. A bit with a non-circular profile can be inserted in the non-circular cavity. A flat bit can be inserted in the slit. A ball is located in the first bore. A pin is located in the second bore. A movable sleeve is located around and movable along the mandrel and formed with a thread. A rotary sleeve is rotationally located around the mandrel and formed with a thread engaged with the thread of the movable sleeve. By rotating the rotary sleeve, the movable sleeve pushes the ball into the non-circular cavity and the pin into the slit.

17 Claims, 8 Drawing Sheets

QUICK AND RELIABLE TOOL

BACKGROUND OF INVENTION

1. Field of Invention

The present invention relates to a tool and, more particularly, to a tool including a chuck for holding a bit and a handle connected to the chuck.

2. Related Prior Art

As disclosed in U.S. Pat. No. 6,877,751, a tool connector includes a drive body 10, a bushing 20, and a push ring 30. The drive body 10 includes a polygonal extension rod 11 and a hole 15 in communication with two lots 16. The bushing 20 is secured on the drive body 10. The push ring 30 is secured on the bushing 20. A spring 24 is compressed between the bushing 20 and a locking plate 25, which is located against a portion of the push ring 30. The locking plate 25 includes a polygonal hole 26.

Normally, the locking plate 25 is tilted. The locking plate 25 is in parallel to a plane defined at an open end of the push ring 30 when the push ring 30 is moved relative to the busing 20. Now, a bit 40 can be inserted through the locking plate 25. When the push ring 30 is released, the locking plate 25 is returned to the tilted position by the spring 24. An internal edge of the locking plate 25 engages with the bit 40, thus keeping the bit 40 on the tool connector. However, the push ring 30 could easily be moved by accident so that the locking plate 25 could be disengaged from the bit 40. Thus, the bit 40 could get lose and detached from the tool connector.

The present invention is therefore intended to obviate or at least alleviate the problems encountered in prior art.

SUMMARY OF INVENTION

It is the primary objective of the present invention to provide a reliable tool.

To achieve the foregoing objective, the tool includes a chuck connected to a handle. The chuck includes a mandrel including a non-circular cavity defined therein, a slit in communication with the non-circular cavity, a first bore in communication with the non-circular cavity, and a second bore in communication with the slit. A bit with a non-circular profile can be inserted in the non-circular cavity. A flat bit can be inserted in the slit. A ball is movably located in the first bore. A pin is movably located in the second bore. A movable sleeve is located around and movable along the mandrel and formed with a thread. A rotary sleeve is rotationally located around the mandrel and formed with a thread engaged with the thread of the movable sleeve. By rotating the rotary sleeve, the movable sleeve pushes the ball into the non-circular cavity and the pin into the slit.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Referring to FIGS. 1 through 4, a tool includes a handle 1 and a chuck 2 according to the preferred embodiment of the present invention. A portion of the chuck 2 is inserted in and secured to the handle 1. Various bits can be held by the chuck 2.

The chuck 2 includes a mandrel 10, a movable sleeve 40, a rotary sleeve 50, a knob 60 and a skin 70. The mandrel 10 includes an insert 12 and a holder 20. The insert 12 includes an annular groove 14 defined therein near the holder 20. The insert 12 further includes a flat end 11 far away from the holder 20 and an aperture 13 defined in the flat end 11.

The diameter of the holder 20 is larger than that of the insert 12. The holder 20 includes a cavity 25 axially defined therein. The cavity 25 is non-circular and preferably hexagonal in a front view such as FIG. 2. The holder 20 further includes a slit 24 defined therein, thus dividing the holder 20 into two branches that can be forced towards each other. The holder 20 further includes bores 21 and 22 transversely defined therein. Both of the bores 21 and 22 are in communication with the slit 24. The bore 22 is preferably a countersink hole with an annular shoulder formed between large and small sections. A bore 23 is defined in one of the branches of the holder 20. The bore 23 is in communication with the cavity 25. The holder 20 includes a groove 26 defined in the other branch thereof. The groove 26 is separated from the cavity 25.

The movable sleeve 40 can be moved axially but cannot be rotated relative to the other elements of the chuck 2. The movable sleeve 40 includes a thread 41 formed on a section and a pusher 42 formed on an opposite section. The movable sleeve 40 includes a bore 43 axially defined therein. The movable sleeve 40 further includes, on an internal face thereof, three cylindrical faces 44, 48 and 49, an annular groove 45 next to the cylindrical face 44, and an annular slope 47 between the cylindrical faces 48 and 49. The diameter of the cylindrical face 48 is larger than that of the cylindrical face 49. The pusher 42 includes a slit 54 defined therein, thus dividing the pusher 42 into two branches. A screw hole 46 is transversely defined in one of the branches of the pusher 42 so that the screw hole 46 is in communication with the bore 43.

The rotary sleeve 50 includes an engagement face 51 on the outside and a thread 52 on the inside. The engagement face 51 is non-circular and preferably polygonal when it is viewed along an axis thereof. The rotary sleeve 50 further includes an annular flange 53 on the inside at one of two open ends thereof.

The knob 60 includes an annular recess 61 on the outside, an annular shoulder 62 on the inside, and an engagement face 63 on the inside. The engagement face 63 is non-rotational and preferably polygonal when it is viewed along an axis thereof corresponding to the engagement face 51.

The skin 70 includes an anti-skid face 71 on the outside and a smooth face 72 on the inside. The anti-skid face 71 includes ribs formed thereon.

In assembly, the insert 12 is inserted in the handle 1 when the handle 1 is molded. Some of the material of the handle 1 filled in the aperture 13. Thus, the chuck 2 is secured to the handle 1 when the material is cured. Because of the flat end 11 of the insert 12, the chuck 2 can only be rotated together with the handle 1.

A rod 34 is inserted in the slit 24 via the bore 21. A pin 30 is formed with a head 31 and a body 32. The diameter of the head 31 is larger than the diameter of the body 32. The body 32 of the pin 30 is inserted in the bore 22 through a helical spring 33. The helical spring 33 is compressed between the head 31 of the pin 30 and the shoulder formed in the bore 22 so that the body 32 of the pin 30 is retained outside the slit 24. However, the body 32 of the pin 30 can be inserted into the slit 24. A ball 35 is inserted in the cavity 25 through the bore 23.

The rotary sleeve 50 is provided around the mandrel 10. The annular flange 53 of the rotary sleeve 50 is located against an annular shoulder formed between the insert 11 and the holder 20. A C-clip 15 is located in the annular groove 14. Thus, the rotary sleeve 50 is prevented from moving along the mandrel 10 but allowed to rotate around the mandrel 10.

The movable sleeve 40 is located around the mandrel 10. The thread 41 of the movable sleeve 40 is engaged with the thread 52 of the rotary sleeve 50. The head 31 of the pin 30 is located against the cylindrical face 48 of the movable sleeve 40. Now, the head 31 of the pin 30 may or may not be located against the annular slope 47 of the movable sleeve 40. A portion of the ball 35 can be moved into the annular groove 45 of the movable sleeve 40. A screw 36 is driven in the groove 26 of the holder 20 via the screw hole 46 of the movable sleeve 40. Thus, the movable sleeve 40 is prevented from rotation around the holder 20 but allowed to move along the holder 20 when the rotary sleeve 50 is rotated.

The knob 60 is located around the rotary sleeve 50. The engagement face 63 of the knob 60 is in firm contact with the engagement face 51 of the rotary sleeve 50. The knob 60 can be fit on the rotary sleeve 50 or adhesive can be provided between the engagement faces 63 and 51. The annular shoulder 62 of knob 60 is located against an end of the rotary sleeve 50.

The skin 70 is located in the annular recess 61 of the knob 60. The skin 70 can be fit in the annular recess 61 or adhesive can be provided between the skin 70 and the knob 60.

Figure 1:
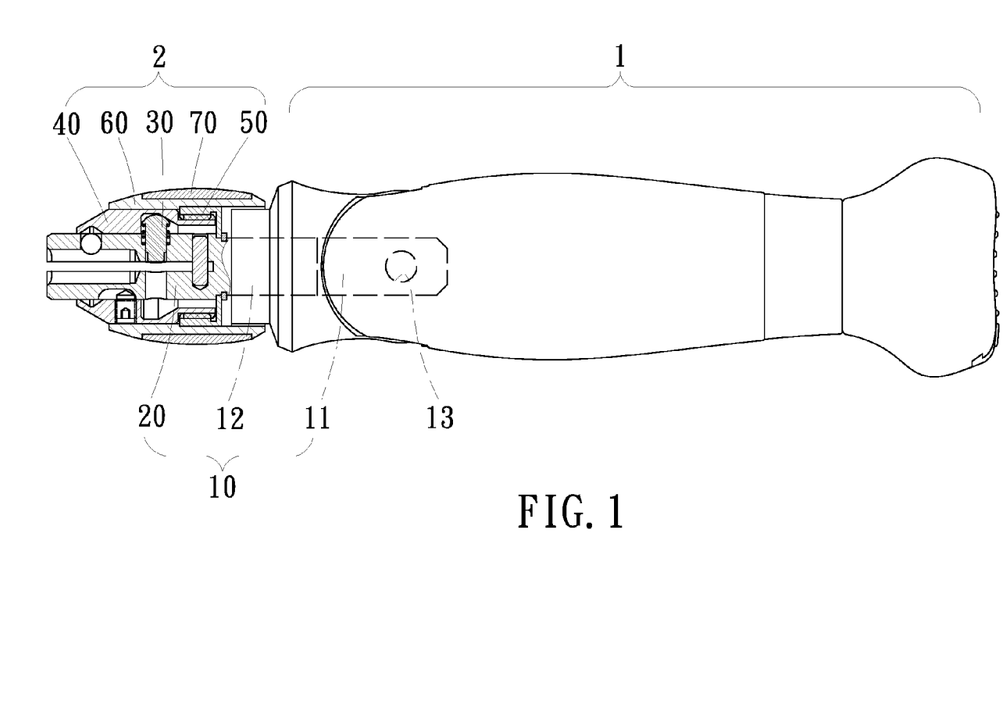
FIG. 1 is a partially cross-sectional view of a tool according to the preferred embodiment of the present invention.
Figure 2:
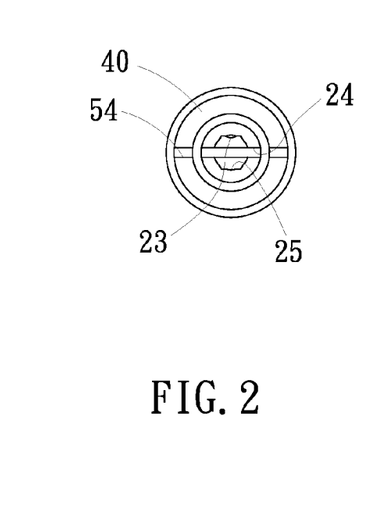
FIG. 2 is a front view of a chuck of the tool shown in FIG. 1.
Figure 3:
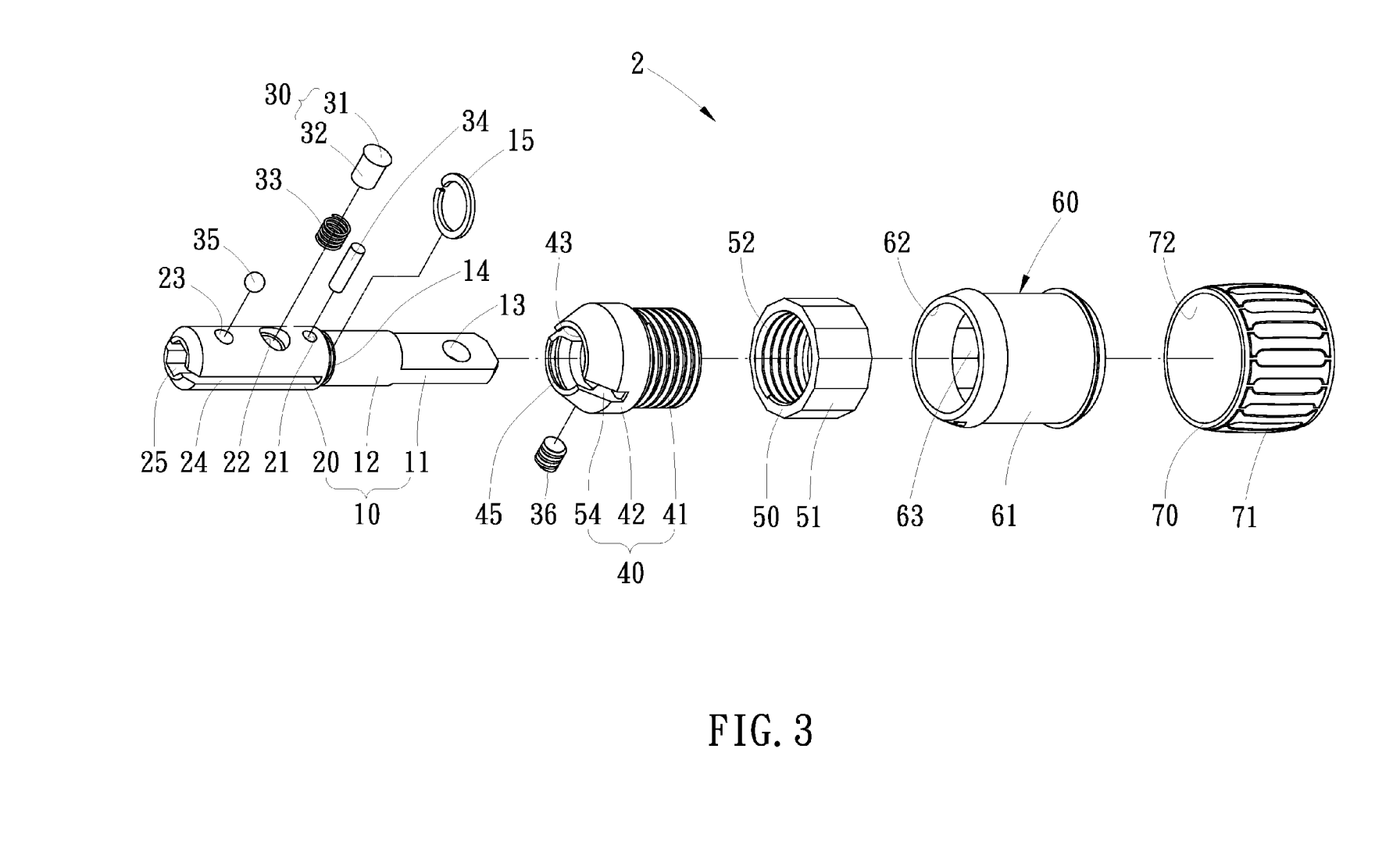
FIG. 3 is an exploded view of the tool shown in FIG. 1.
Figure 4:
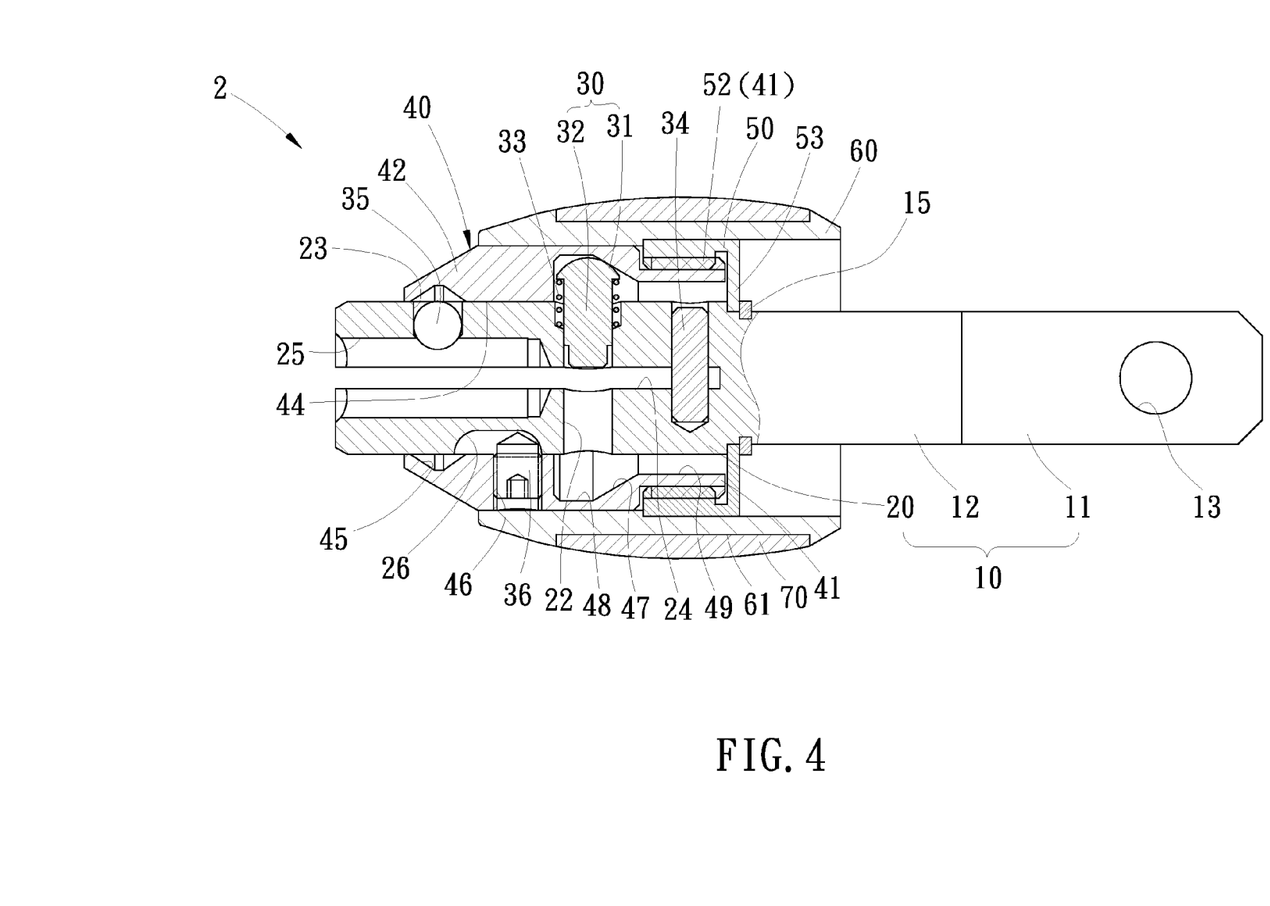
FIG. 4 is a cross-sectional view of the chuck shown in FIG. 2.
Figure 5:
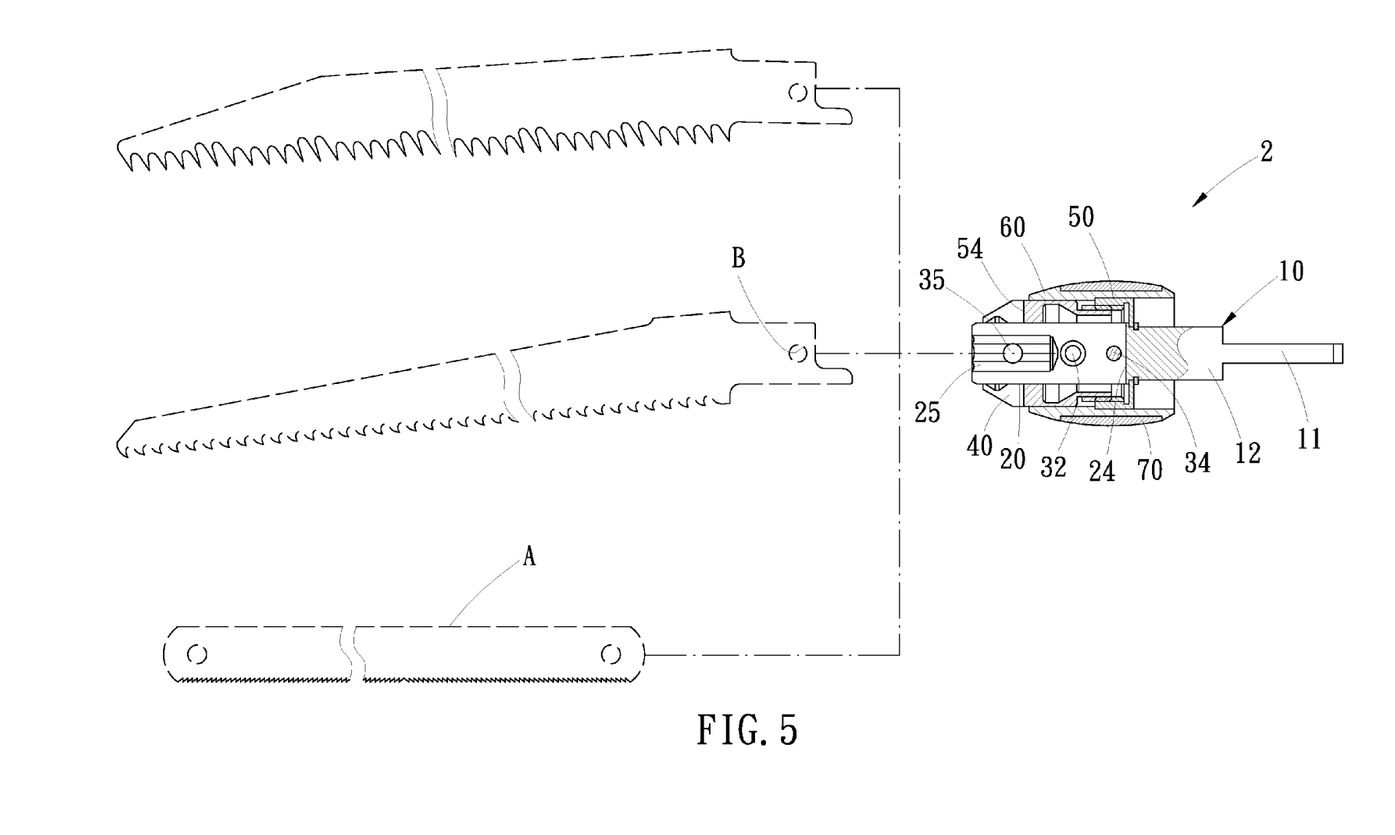
FIG. 5 is a cross-sectional view of the chuck shown in FIG. 4, with various bits shown in phantom lines.

Referring to FIGS. 4 and 5, there are shown three bits that can be held with the chuck 2. The bits are saws A. Each of the saws A includes an aperture B defined therein near an end. The end of each of the saws A can be inserted into the slit 24 because the body 32 of the pin 30 is located outside the slit 24. The aperture B of the saw A is aligned with the bore 22 when the end of the saw A is located against the rod 34.

Figure 6:
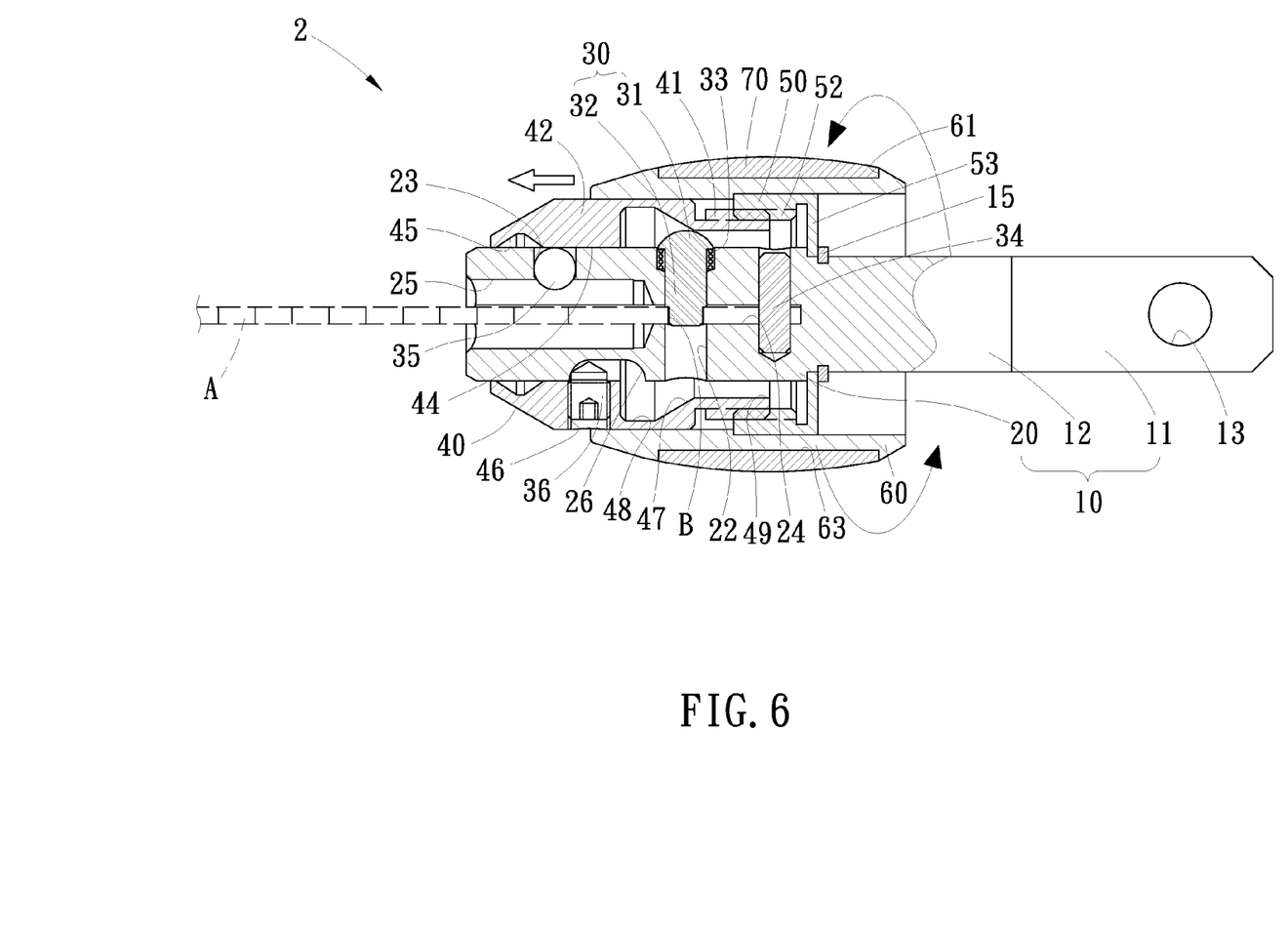
FIG. 6 is a cross-sectional view of the chuck in another position than shown in FIG. 5, with one of the bits inserted in the chuck.
Figure 7:
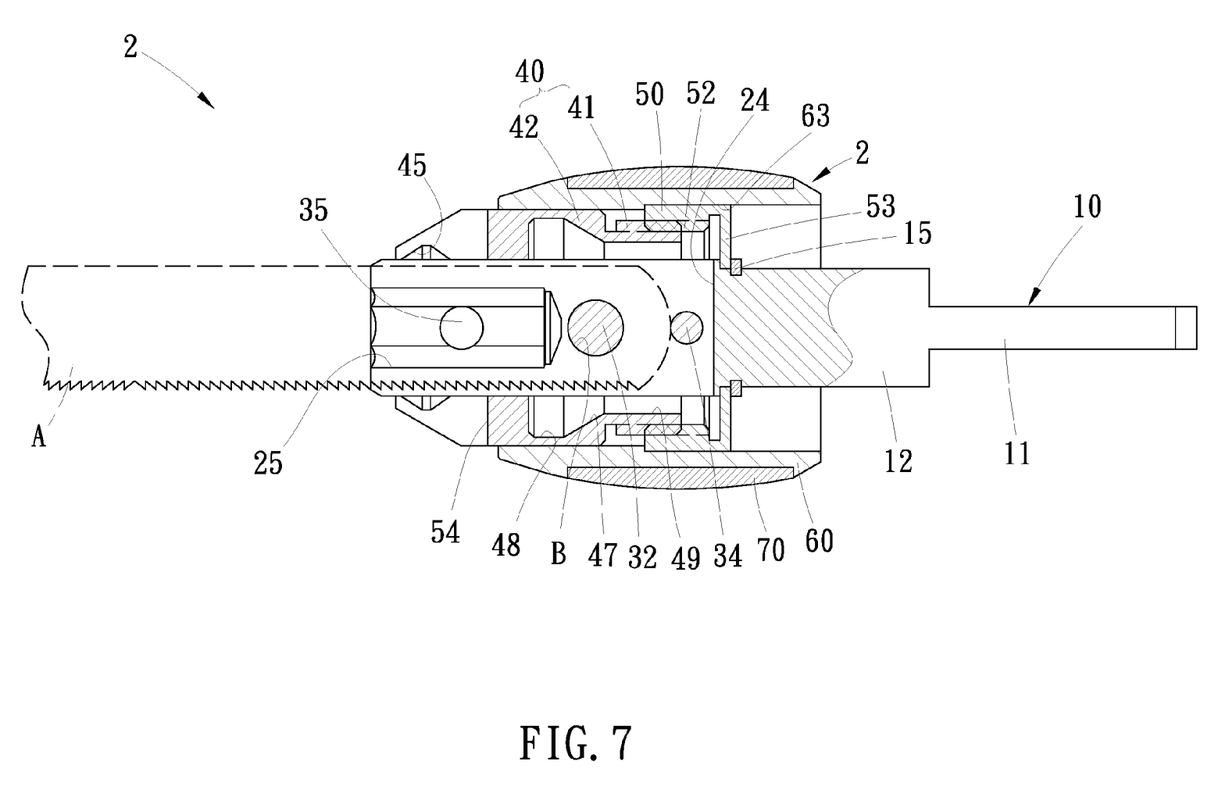
FIG. 7 is another cross-sectional view of the chuck shown in FIG. 6.

Referring to FIGS. 6 and 7, by maneuvering the knob 60, which is coated with the skin 70, the rotary sleeve 50 is rotated so that the movable sleeve 40 is moved along the mandrel 10. Thus, the tip of the pin 30 is inserted into the aperture B of the saw A as the head 31 of the pin 30 is pushed by the annular slope 47. The saw A is sandwiched between an annular shoulder formed on the body 32 of the pin 30 and one of the branches of the holder 20. Thus, the saw A is firmly held with the chuck 2.

Figure 8:
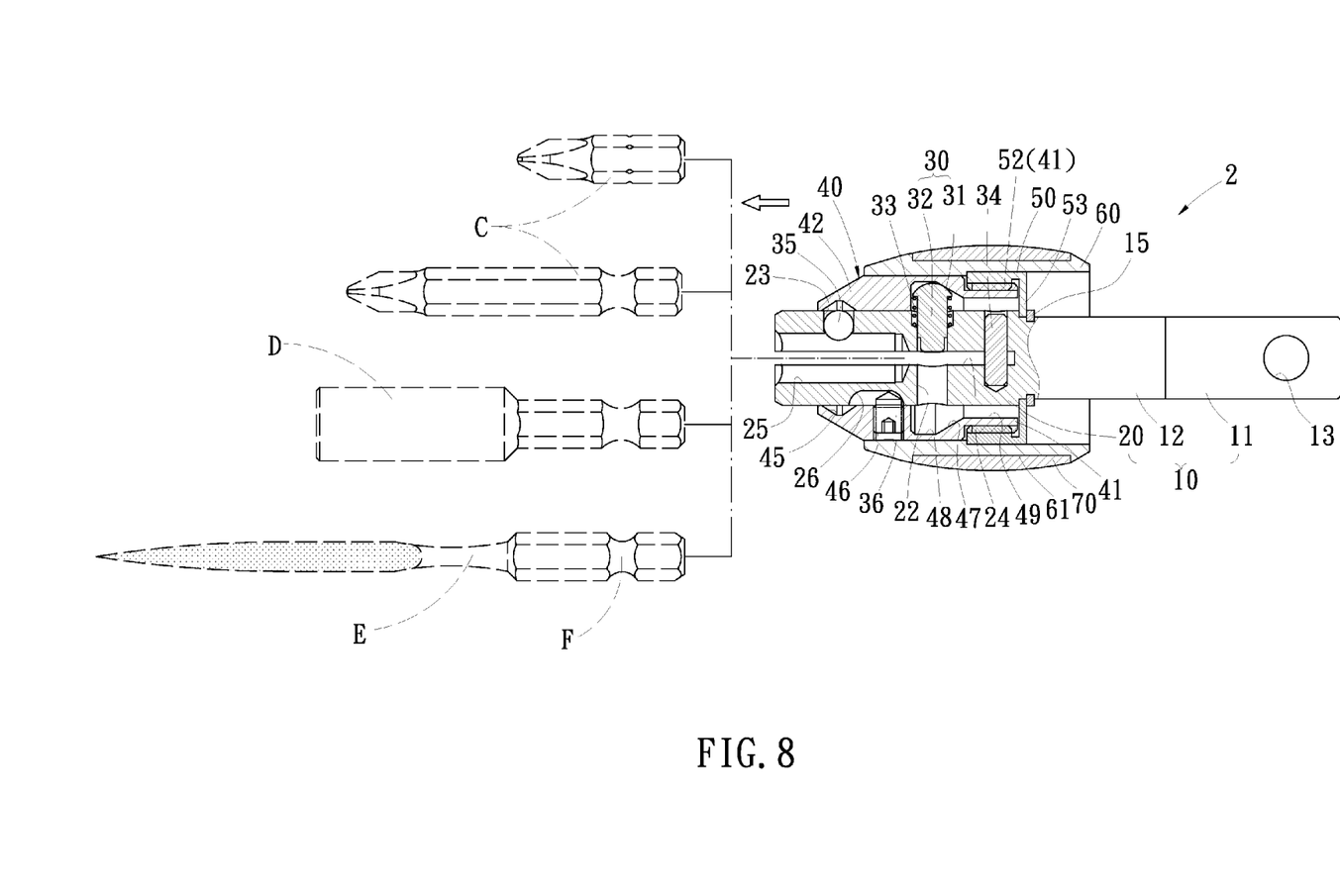
FIG. 8 is a cross-sectional view of the chuck shown in FIG. 4, with various bits shown in phantom lines.

Referring to FIG. 8, there are shown four more bits that can be held with the chuck 2. The four bits include two screwdrivers C, a socket D and a file E. Each of the bits includes an annular groove F or several recesses F defined therein near an end. The end of each of the bits can be inserted into the cavity 25 of the holder 20 because the ball 35 can be moved out of the cavity 25 completely as the ball 35 can be moved into the annular groove 45 of the movable sleeve 40 partially. The annular groove F or one of the recesses F of the bit is aligned with the bore 23 when the end of the bit is located against a closed end of the cavity 25.

Figure 9:
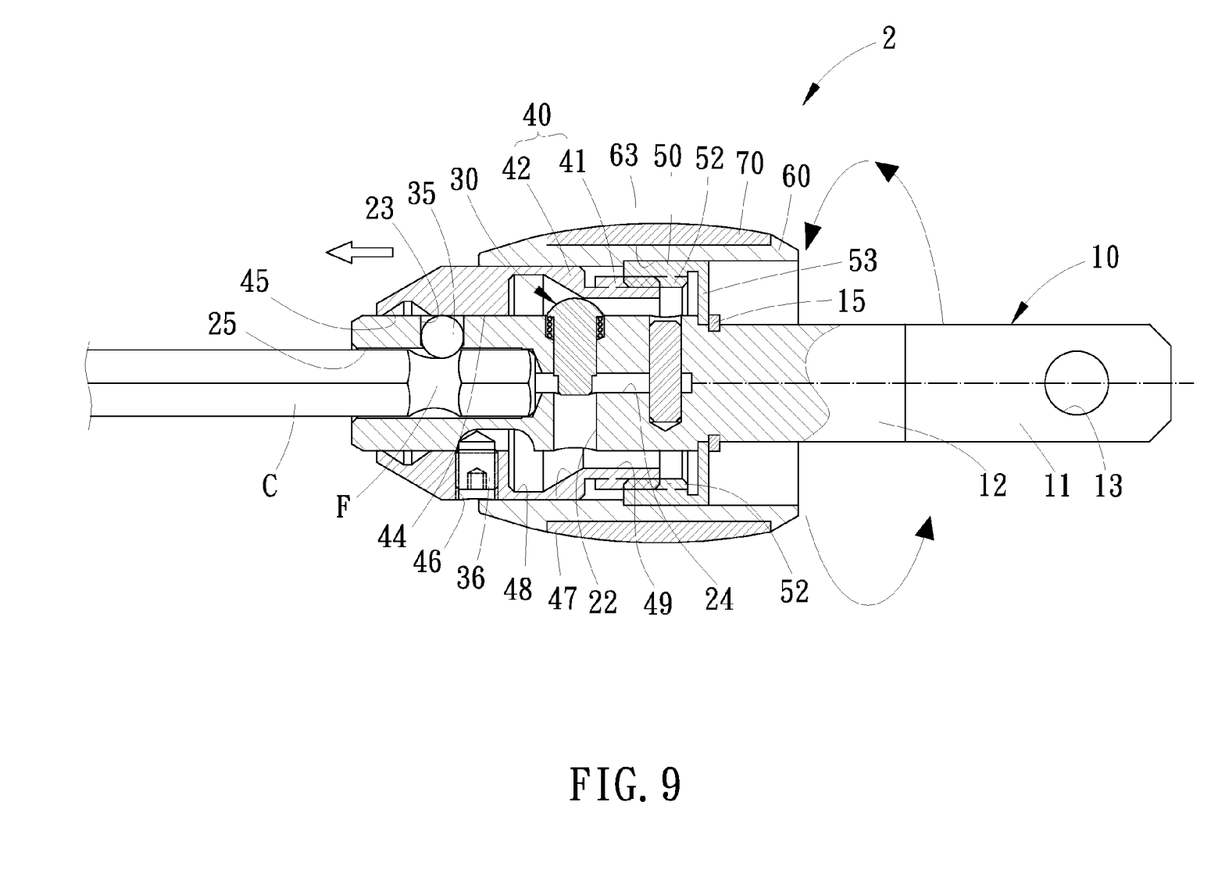
FIG. 9 is a cross-sectional view of the chuck in another position than shown in FIG. 8, with one of the bits inserted in the chuck.

Referring to FIG. 9, by maneuvering the knob 60, which is coated with the skin 70, the rotary sleeve 50 is rotated so that the movable sleeve 40 is moved along the mandrel 10. Thus, a portion of the ball 35 is inserted into the annular groove or recess F of the bit as an opposite portion of the ball 35 is pushed by the cylindrical face 44 of the movable sleeve 40. The bit is held with the chuck 2.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A tool including a chuck including: a mandrel including a non-circular cavity defined therein for receiving a non-circular bit, a slit in communication with the non-circular cavity, a first bore in communication with the non-circular cavity, and a second bore in communication with the slit, wherein a flat bit can be inserted in the slit; a ball located in the first bore; a pin located in the second bore; a movable sleeve located around and movable along the mandrel and formed with a thread; and a rotary sleeve rotationally located around the mandrel and formed with a thread engaged with the thread of the movable sleeve, wherein by rotating the rotary sleeve, the movable sleeve pushes the ball into the non-circular cavity and the pin into the slit.

2. The tool according to claim 1, wherein the mandrel includes:
an insert for insertion in a handle; and
a holder extending from the insert, wherein the non-circular cavity, the slit and the first and second bores are defined in the holder.

3. The tool according to claim 2, wherein a diameter of the insert is smaller than that of the holder, wherein the rotary sleeve includes an annular flange located against the holder.

4. The tool according to claim 3 further including a C-clip located in an annular groove defined in the insert, wherein the annular flange of the rotary sleeve is sandwiched between the holder and the C-clip.

5. The tool according to claim 1 further including a spring compressed between a portion of the mandrel and a portion of the pin to keep the pin out of the slit.

6. The tool according to claim 5, wherein the pin includes a body and a head located against the spring.

7. The tool according to claim 1, wherein the movable sleeve includes an annular groove for receiving the ball so that the ball is completely located out of the non-circular cavity.

8. The tool according to claim 7, wherein the movable sleeve includes a cylindrical face for pushing a portion of the ball so that an opposite portion of the ball enters the non-circular cavity.

9. The tool according to claim 1, wherein the movable sleeve includes a cylindrical face in contact with an end of the pin when an opposite end of the pin is completely located out of the slit.

10. The tool according to claim 9, wherein the movable sleeve includes an annular slope for pushing the pin into the slit as the movable sleeve moves along the mandrel.

11. The tool according to claim 1 further including a screw, wherein the mandrel includes a groove defined therein, wherein the movable sleeve includes a screw hole, wherein the screw is driven in the groove of the mandrel through the screw hole of the movable sleeve.

12. The tool according to claim 1, further including a rod driven into the slit for stopping an end of the flat bit so that the pin can precisely be inserted into an aperture defined in the flat bit.

13. The tool according to claim 1 further including a knob located around the rotary sleeve so that they can be rotated together.

14. The tool according to claim 13, wherein the knob includes a non-circular internal face, wherein the rotary sleeve includes a non-circular external face in contact with the non-circular internal face of the knob.

15. The tool according to claim 13 further including a skin located around the knob.

16. The tool according to claim 15, wherein the knob includes an annular recess for receiving the skin.

17. The tool according to claim 15, wherein the skin includes a rough external face.

* * * * *